United States Patent [19]

Alam et al.

[11] Patent Number: 4,847,813

[45] Date of Patent: Jul. 11, 1989

[54] METHOD FOR EXTENDING THE LATERAL SUBSURFACE COVERAGE IN VSP SURVEYS

[75] Inventors: M. Aftab Alam, Weybridge, England; Akkas Manzur, Houston, Tex.

[73] Assignee: Western Atlas International, Inc., Houston, Tex.

[21] Appl. No.: 121,459

[22] Filed: Nov. 16, 1987

[51] Int. Cl.⁴ .......................... G01V 1/16; G01V 1/36
[52] U.S. Cl. .......................................... 367/57; 367/61
[58] Field of Search ....................... 367/24, 57, 58, 61; 364/421, 422

[56] References Cited

U.S. PATENT DOCUMENTS

| | | | |
|---|---|---|---|
| 2,757,356 | 7/1956 | Haggerty | 367/24 |
| 2,992,694 | 7/1961 | Musgrave et al. | 367/57 |
| 3,371,310 | 2/1968 | Silverman | 367/24 |
| 4,380,059 | 4/1983 | Ruehle | 367/46 |
| 4,627,036 | 12/1986 | Wyatt | 367/67 |

OTHER PUBLICATIONS

Vertical Seismic Profiles: Their Application to Geophysics *Geophysical Prospecting*, 1980, pp. 676-699.
Computer Processing of Vertical Seismic Profile Data *Geophysics*, 1983, pp. 272-287.
"Migration of VSP data by Ray Equation Extrapolation in 2D Variable Velocity Media," *Geophysical Prospecting*, V34, N5, 8/86, Liang-Zie Hu et al.
Bois et al., "Well-to-Well Seismic Measurements," *Geophysics*, vol. 37, #3, Jun. 1972.
Morgan, D. R., "A Novel Broad-Band Beamformer," *J. Acoust. Soc. Amer.*, vol. 56, #3, Sep. 1974.
Verm et al., "Imaging VSP's 3 Kilometers Beyond the Borehole Receiver," OTC 5570, 4/27/87.

*Primary Examiner*—Thomas H. Yarcza
*Assistant Examiner*—Ian J. Lobo
*Attorney, Agent, or Firm*—William A. Knox

[57] ABSTRACT

In a VSP survey, the subsurface coverage of the bounce points of primary reflections is limited to one-half the offset between a borehole and a seismic-source point. The subsurface coverage may be extended by use of selected multiply-reflected wavefield arrivals.

2 Claims, 4 Drawing Sheets

METHOD FOR EXTENDING THE LATERAL SUBSURFACE COVERAGE IN VSP SURVEYS

BACKGROUND OF THE INVENTION

1. Field of the Invention

This invention is concerned about VSP/CDP transforms with particular application to use of multiple reflections to extend the lateral subsurface coverage of VSP surveys, such as might be found in class 367.

2. Discussion of the Prior Art

In the art of vertical seismic profiling (VSP), a downhole geophone, usually a three-axis module, is lowered into a borehole. The module is locked against the wall of the borehole at a plurality of successive depth stations. Typically, the depth increment between stations might be 15 to 25 meters (m). At each depth station, a seismic sound source at or near the surface is fired one or more times. Often, a plurality of source points is occupied. The source points may be progressively offset from the mouth of the borehole by distances ranging from 200 m to a maximum offset equal to about one-third of the borehole depth. In some operations, two lines of source points are occupied, the lines intersecting at approximate right angles. At each depth station, the downhole geophone module detects reflected-path and direct-path seismic signals from each of the respective source points. The data thus gathered is recorded for later processing.

The downhole geophone module includes three, gimbal-mounted sensors whose axes of maximum sensitivity are mutually orthogonal regardless of borehole deviation. See for example U.S. patent application Ser. No. 924,679, filed Oct. 29, 1986, now abandoned, assigned to a division of the assignee of this invention. Signals from the three sensors are separately recorded. By use of well-known computer-aided processing, from the amplitude and arrival times of seismic signals, the azimuth and elevation angle of the signal travel-paths can be resolved.

From Snell's law for primary reflections from horizontally-layered strata, it is known that the maximum lateral extent of subsurface coverage for reflected seismic signals is one-half the offset between a sensor and a seismic source located at the surface.

We have discovered that the lateral subsurface coverage of VSP data, for a given geophone depth and source-point offset can be significantly extended by use of selected multiple reflections as well as by use of the usual primary reflections.

Multiple reflections occur when a wave-field from a source point is reflected more than once between two subsurface reflectors or between a reflector and a near-surface acoustic interface such as the air-water boundary in marine work. A familiar example might be in the barber shop having mirrors on opposite walls. One sees oneself reflected repeatedly between the two mirrors ad infinitum.

In conventional seismic work, multiple reflections are considered to be serious contaminants of desired seismic data. Heroic measures are taken in routine data processing to rid the seismic profiles of multiple contamination. See for example U.S. Pat. No. 4,380,059, issued Apr. 12, 1983 to Ruehl. That inventor proposes an elaborate, expensive computer program to remove multiples by f-k filtering.

The presence of multiple reflections in VSP surveys has long been recognized. For example, see "Vertical Seismic Profiles: Their Application to Exploration Geophysics" by P. Kenneth et al., *Geophysical Prospecting*, 1980, pp. 676–699; and "Computer Processing of Vertical Seismic Profile Data" by M. W. Lee et al., *Geoohyics*, 1983, pp. 272–287. In both papers, the primary purpose of multiple detection and identification is to better remove the effect of the multiples from associated conventional surface profiles so as to improve the structural interpretation thereof.

We propose to turn, what used to be considered nuisance data, to our advantage, thereby to significantly extend the lateral subsurface coverage of a VSP survey.

SUMMARY OF THE INVENTION

We provide a method for extending the lateral subsurface coverage of a VSP survey.

A three component seismic sensor is lowered into a borehole to a plurality of successive depth stations. One or more seismic-source points are distributed at progressively-different offsets from the borehole. As each depth station is occupied, a seismic wavefield is generated at a seismic-source point. The wavefield propagates along direct, once-reflected and multiply-reflected travel paths to the borehole sensor. The respective events may be identified by their arrival-path angle. The signals received by the three-component sensor are separately detected and recorded for each component. The recorded signals may be beam-steered towards the expected arrival-angle of given seismic event, thereby to separately identify direct, primary and multiply-reflected wavefields.

Once-reflected or primary wavefields are identified and are transformed from the VSP to the CDP domain. From that transform, the primaries-only bounce points may be imaged. The multiply-reflected events are next identified and transformed from the VSP to the CDP domain. The multiply-reflected bounce points thus imaged serve to laterally extend the bounce points of the imaged, once-reflected wavefields.

BRIEF DESCRIPTION OF THE DRAWINGS

The novelty and benefits of our invention will best be understood by reference to the accompanying detailed description and the drawings, wherein.

DETAILED DESCRIPTION OF THE PREFERRED EMBODIMENT

Much of the immediately-ensuing discussion is tutorial material directed to the non-specialist to provide a better appreciation for the benefits of this invention.

Figure 1:
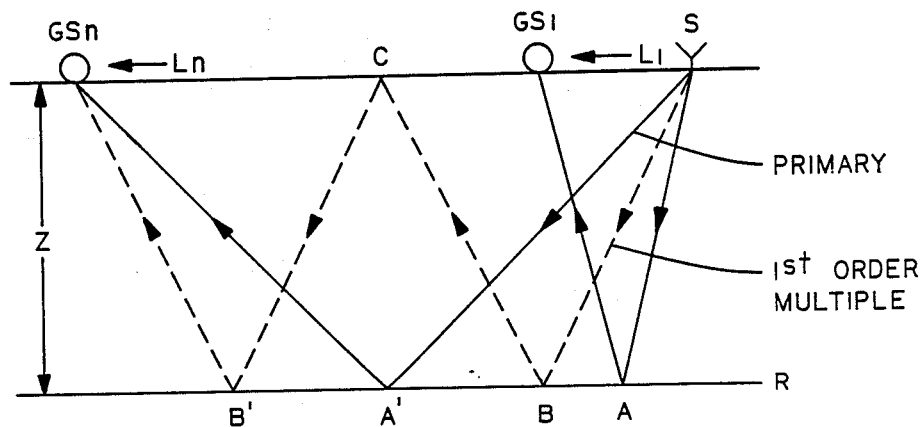
FIG. 1 illustrates reflected raypaths associated with a conventional surface geophone spread.

Referring to FIG. 1, there is shown a layout of surface sensors such as geophones GS, $GS_n$ offset from a seismic source S by distances L, $L_n$. Beneath the surface, lies a reflecting stratum R at a depth Z. A wave field emanating from S is reflected from R at bounce points A, A' returning to GS, and $GS_n$ respectively. According to Snell's law, the angles of incidence and reflection are equal so that bounce points A nd A' are located at one-half the respective offset distances. A first-order multiple reflection will propagate from S to B to C to B' and thence to $GS_n$. Although from FIG. 1, it would appear that additional subsurface coverage, i.e. A'-B', could be obtained by use of the first-order multiple, in modern continuous profiling using surface spreads, the geophone density and length of traverse is virtually unlimited so that complete subsurface coverage is readily obtained by use of primary reflections only. As explained earlier, multiple reflections are suppressed.

In VSP surveys, it is not possible to move the receiver position laterally. For that reason, only limited subsurface coverage is attainable. Using primary reflections only, the coverage is restricted at most, to one-half the offset between the well bore and a seismic source. Of course, it would appear to be possible to extend the subsurface coverage of a VSP survey by simply increasing the offset. There is, however, a practical limit to the offset distance as earlier mentioned. One problem with an excessively-long offset distance is that for relatively shallow strata, wavefields will propagate along refracted rather than reflected travel paths. Although such travel paths can be determined, the presence of mixed refracted and reflected arrivals needlessly complicates the data processing. A further problem exists in the fact that excessively long offsets generate converted shear waves that further contaminate the data.

Figure 2:
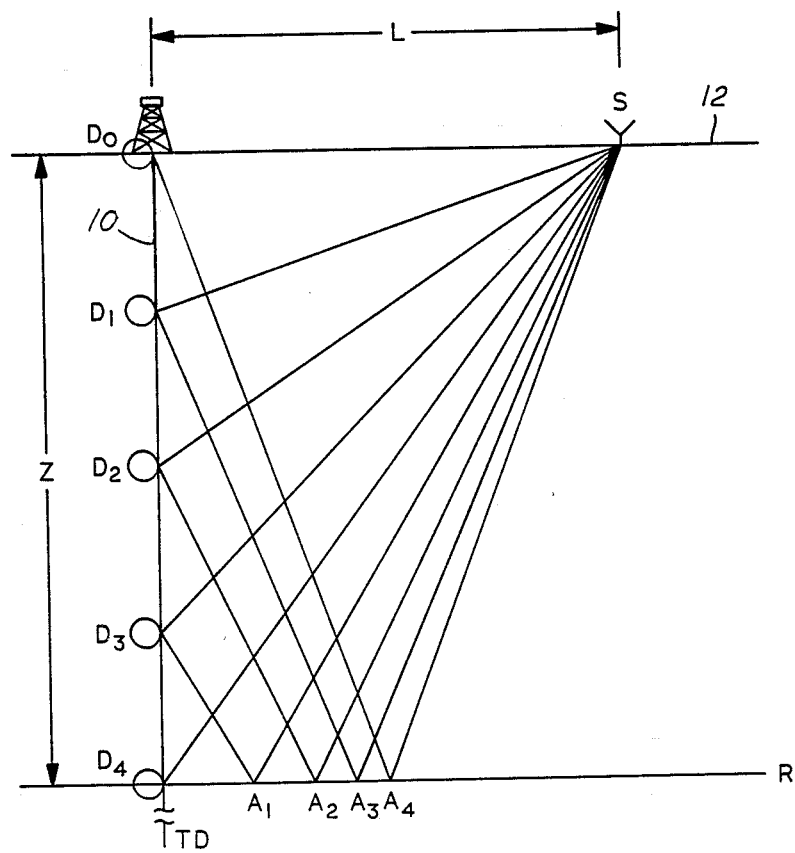
FIG. 2 illustrates VSP raypaths.
Figure 3:
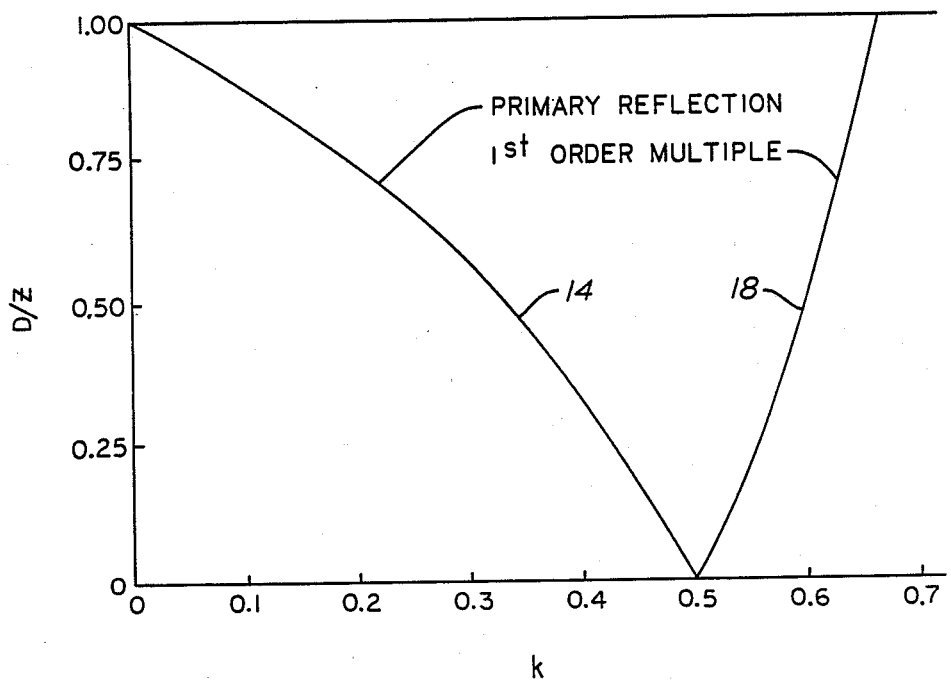
FIG. 3 includes graphs showing the extent of lateral subsurface coverage plotted as a function of D/Z and coefficient, k.

Refer to FIG. 2 where there is shown a borehole 10, drilled beneath the surface 12 to some depth TD, and penetrating below a reflecting stratum R located at depth Z. A three-component sensor module is successively lowered to various depth stations $D_o$–$D_4$ in the borehole. At each level, a seismic source S, offset from the well bore by a distance L, is fired. Each shot of source S generates a wavefield that propagates along a reflected path such as S—$A_3$—$D_1$ and along a direct path such as S—$D_1$. For a geophone at $D_o$, the maximum lateral subsurface coverage is $D_4$—$A_4$ which as before shown, is L/2. As the geophone module is lowered to $D_1$ through $D_4$, the lateral extent of the subsurface coverage decreases as shown at $A_3$, $A_2$, $A_1$. When the geophone depth $D_4$ equals the reflector depth Z, no reflected arrival is possible; only the direct wave-field arrival may be seen. The lateral subsurface coverage is necessarily zero. In FIG. 3, curve 14 is a graph of the ratio D/Z plotted against k, a fractional coefficient of L, such that $X=kL$, where X is the subsurface coverage as a function of the ratio of D to Z. $X=L/2$ when $D/Z=0$ and is zero when $D=Z$.

Figure 4:
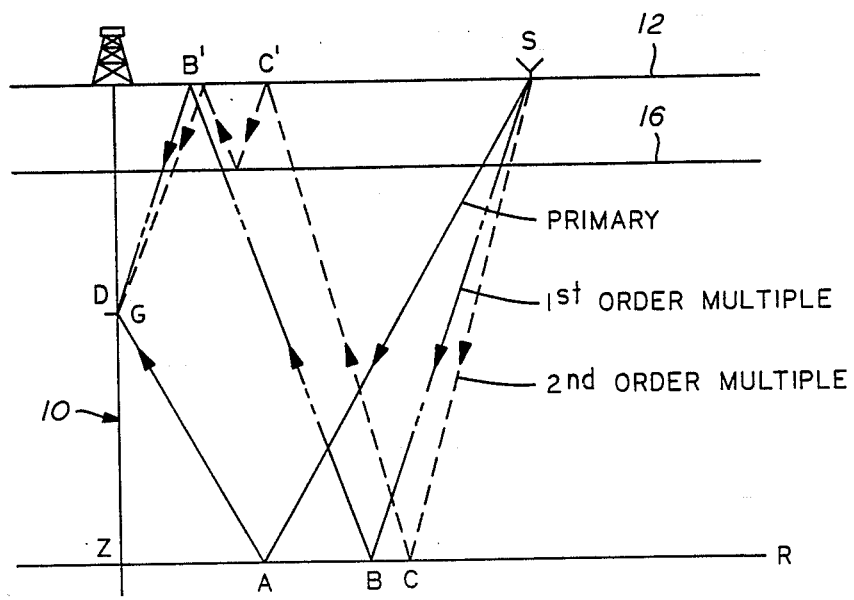
FIG. 4 shows VSP raypaths for a primary reflection as well as first and second order multiples.

FIG. 4 is a simplifield adaptation of FIG. 2, showing possible multiple-reflection paths. The primary reflection as before is S—A—G to a geophone module G at some depth D, in borehole 10. The first-order multiple path is S—B—B'—G, being reflected once from R and once from surface 12. A second-order multiple might take the path S—C—C', thereafter being reflected between the sea floor 16 and water surface 12, before arriving at G. From the geometry of FIG. 4, it is evident that use of the first-order multiple will provide a significant increase in the lateral subsurface coverage. Although use of the second-order multiple is also quite possible, for simplicity, we shall consider hereafter, only the first-order multiple by way of example but not by way of limitation.

Figure 5:
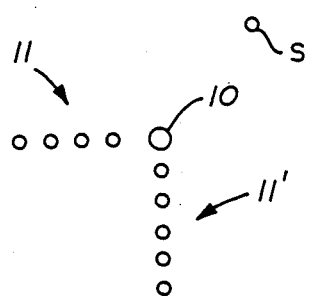
FIG. 5 shows possible source point layouts useful in VSP surveys.

In FIGS. 2 and 4, a single seismic-source point is shown by way of example but not by way of limitation. However, a plurality of source points may be occupied, distributed along one or more lines 11, 11' radiating from the borehole 10 at progressively different offsets as shown in plan view, FIG. 5. Alternatively, the source points may be arranged in a circular pattern. The particular configuration used depends upon the problems to be solved and the environmental and cultural conditions in the area of interest.

From FIGS. 1 and 4, it is instructive to observe that for any reflected wavefield to be received from below a sensor, be the sensor on the surface or in a borehole, the number N, of bounce points must be odd. For a primary reflection, $N=1$; for a multiple $N \geq 3$. That situation may occur in a VSP survey in the case of an interbed multiple generated below the geophone station in the borehole. Similarly, a downgoing, reflected wave field received by a sensor from above (assuming a substantially surface-located source and excluding ghost reflections) must be characterized by an even number M of bounce points where $M \geq 2$.

Figure 6:
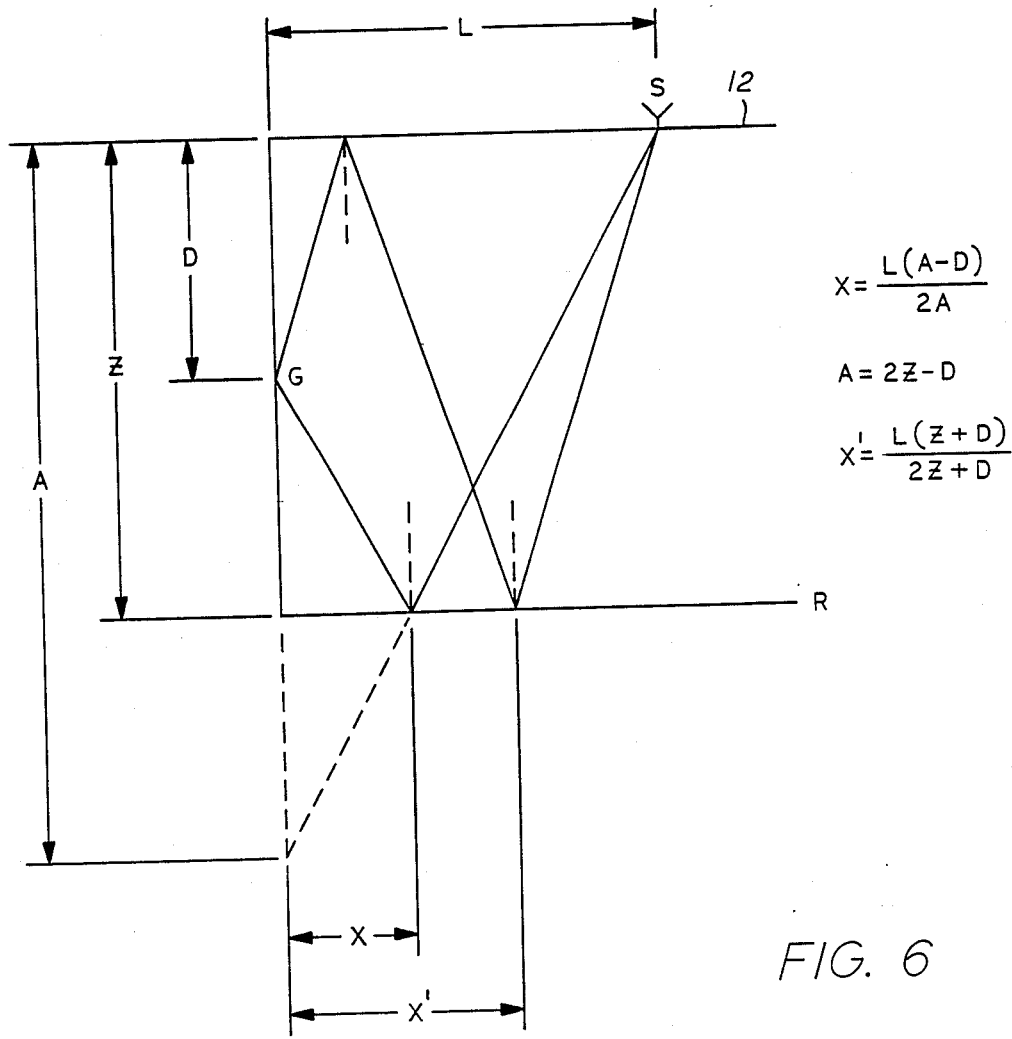
FIG. 6 shows the geometric construction for computing the coefficient k of FIG. 3.

In FIG. 6, we show by geometric construction that for a primary reflection, the lateral subsurface coverage X is determined from $$X=L[(A-D)/2A], \qquad (1)$$

where
$A=2Z-D$,
L=offset, source to borehole,
D=geophone depth,
Z=reflector depth.
For the first-order multiple, the lateral subsurface coverage X' is $$X'=L[(Z+D)/(2Z+D)] \qquad (2)$$

As before stated, curve 14 of FIG. 3 is the solution to (1). Curve 18 of FIG. 3 graphs the solution of (2). Of interest is the fact, that as $D \to 0$, $X' \to 0.5L$, demonstrating that a two-hop multiple cannot exist for a surface geophone.

From FIG. 3, we see that the maximum lateral subsurface coverage, using the first-order multiple, increases from 0.5L to 0.66L. Furthermore, the maximum lateral subsurface coverage, using a first-order multiple occurs just when the lateral subsurface coverage due to a primary reflection is approaching a minimum. That is a distinct advantage.

Figure 7:
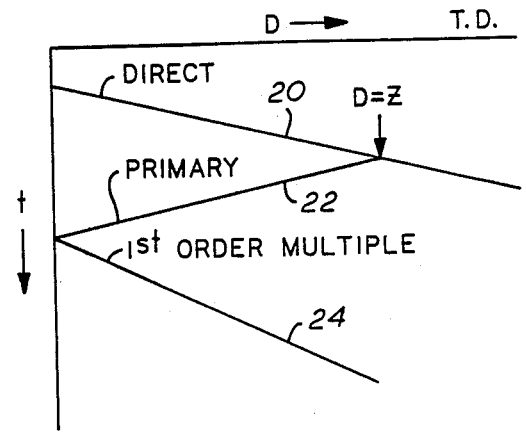
FIG. 7 is a time/depth graph of the direct arrival, primary reflection and first order multiple reflection.

FIG. 7 is a graph of geophone depth D vs. event arrival time t representative of the results that might be obtained from the geometry of FIGS. 2 and 6. The slope of curve 20, the direct arrival, would be representative of the average velocity of the medium through which the wavefield propagated. The timedepth graph for the primary reflection is shown as 22. Allowing for the geometry of the respective travel paths, the slope of curve 22 is of opposite sign to curve 20, assuming an isotropic medium. Curves 20 and 22 intersect at depth $D=Z$. The time-depth graph for the first-order multiple is shown as curve 24. The slope of curve 24 is greater than that of curve 20. Curve 24 intersects curve 22 at $D=0$. From that observation, one can identify a corresponding, preselected multiply-reflected wavefield useful in extending the subsurface coverage.

The slopes of the curves of FIG. 7 may be termed VSP moveout and are analogous to normal moveout for surface profiles. Events plotted in the format of FIG. 7 can be time-aligned for stacking and other processing using the expression $$(T-tz)^2=(To-tz)^2[1+L^2/((ToV^2-tzV^2)(To-tz))], \quad (3)$$

where
- $To$ = vertical two-way time between surface and reflector;
- $tz$ = uphole time between a geophone at depth D and the surface;
- $T$ = arrival time of a primary olus uphole time;
- $L$ = offset, wellbore to source;
- $V$ = rms velocity of the medium.

The above assumes a constant-velocity, horizontally-layered isotropic medium above a flat-lying reflector. In the presence of dip and a variable velocity, appropriate modifications to (3) must be made particularly to the $V^2$ term. Equation (3) may be modified for VSP moveout for a first-order multiple by a suitable modification of the ray-path geometry.

From the time-aligned data, the subsurface may be imaged by converting the data from the VSP domain to the CDP domain by a suitable VSP/CDP transform. Such transforms are well known to those skilled in computer-aided seismic data processing; the precise algorithms per se, form no part of this invention. For example, see U.S. Pat. No. 4,627,036. Most techniques involve an initial estimate of the subsurface structure. Thereafter, iterative ray-tracing routines are applied until the reflection-point trajectories match the observed recorded reflection travel times.

Figure 8A:
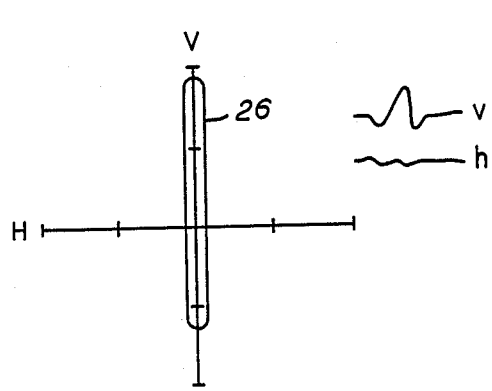
FIGS. 8a–8c are hodographs for determining the arrival angle of wavefield ray paths.
Figure 8B:
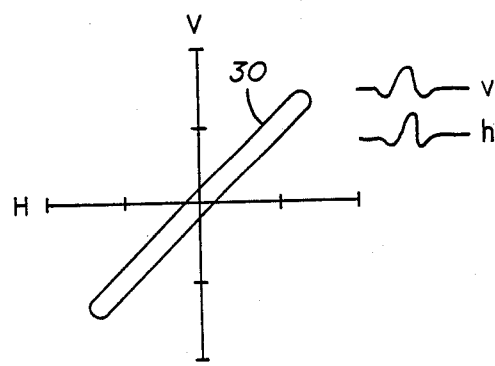
Figure 8C:
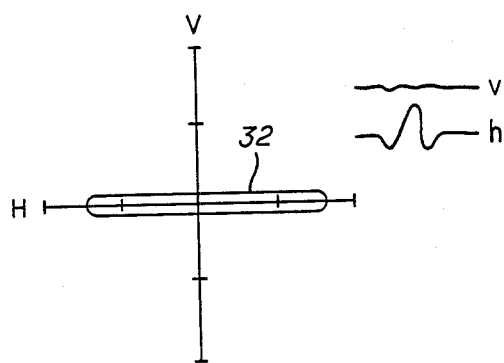

In the initial processing steps, it is necessary to sort out wave fields received from below the geophone module (primary reflections) and wavefields received from above as in FIG. 2. That operation is most conveniently done by means of hodographs. A hodograph is defined as the figure that is traced by the termini of moving vectors. Refer to FIGS. 8a-8c, wherein are shown vertical and horizontal axes V and H. Signal envelopes v and h represent the amplitudes of signal-components received by the vertically- and horizontally-sensitive geophones in a downhole geophone module. In the case of FIG. 8a the resolved amplitude vector envelope 26 of a plurality of measurements of amplitude as a function of offset would be aligned with the vertical axis. In 8b, the signal amplitudes v and h are nearly equal, providing a vector envelope 30 aligned at 45°, suggesting a wavefield arriving at an angle from above. Finally, in FIG. 8c, the predominant component is horizontal. For a wavefield arriving from below, the vector envelope 32 of FIG. 8c would be rotated clockwise to the appropriate arrival angle. Use of a hodograph is a type of a numerical beam steering.

Figure 9:
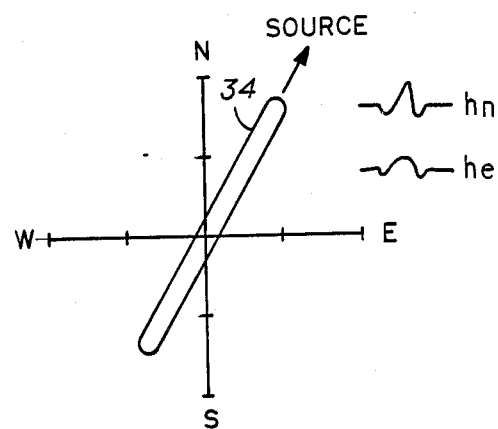
FIG. 9 is a hodograph for determining the azimuth angle of wavefield ray paths with respect to the source.

The geophone module tends to rotate in azimuth as it is moved up or down the borehole. Its orientation is never known a priori absent auxiliary orientation measuring devices. However, its azimuth relative to a source can be resolved from the relative amplitudes of the output signals of the two orthogonally-aligned horizontal geophones as shown in FIG. 9. The resultant vector envelope may be measured relative to north and east or with respect to an arbitrary coordinate system.

The sensitivities of the three geophones in the downhole geophone are carefully matched to less than 3%. Inasmuch as the arrival angles for direct, once-reflected and multiply-reflected wavefields are substantially different, it is not difficult to uniquely identify each event. Identification is preferably done by means of a computer-aided beam-steering program.

Our presently-preferred method for extending the lateral subsurface coverage of a VSP survey is as follows:

Because multiple reflections arrive much later in time than do the primaries, we record data in the field for a much longer recording time than normal. Whereas a 3-to-4 second seismogram might be adequate for conventional VSP work, we would record perhaps, a 6-to-8 second seismogram. Next, we separate the downgoing wavefields from the upcoming primary arrivals as before described and image the up-wave arrivals using conventional VSP/CDP transforms.

From the processed conventional profile, we then identify and preselect those multiples needed for imaging the extensions of selected horizons from amongst the many other multiples contributing to the downgoing wavefield, perhaps with the aid of a time-depth plot such as FIG. 7. Finally, we image the bounce points of those preselected multiples using the basic VSP/CDP transform method above, employing an iteratve ray-tracing technique. In such raytracing one must be aware of the presence of even- or odd-bounce multiples.

The specific multiples within expected time windows are identified by first beam-steering the received three-component data in the expected direction of the multiple arrival. The steering angle is then fine-tuned to maximize the signal strength in that time window.

One multiple at a time is imaged. To process the multiple, we start from the final model obtained from the imaging of the primary reflections. An initial lateral extension of the model is estimated and we iteratively ray-trace the selected multiple. Bounce points and travel times of the event are stored in a table for that source-receiver combination.

A short time window, equal in width to the time interval occupied by the main envelope of the VSP wavelet, is block-shifted and placed at the calculated bounce point. That procedure is repeated for all source and receiver combinations in the VSP dataset. The block-shifted wavelets are then binned into vertical strips and summed in the usual manner. If the resulting target image does not coincide with the postulated extension of the model, the model extension is interactively revised. That is done by choosing the extended segment so that it is a smooth extension of the initial primary-only model.

The above model becomes the new input for imaging the next identified preselected multiple. The process is repeated for all of the remaining identified multiples. Results from the imaging of primaries and identified multiples are merged to produce the final VSP/CDP transform.

Many variations to our procedure may be made by those skilled in the data-processing art which nevertheless would fall within the scope and spirit of this invention. For example, there are a number of competitive computer-aided proprietary algorithms for accomplishing VSP/CDP transforms and for iterative ray-tracing processes. The particular algorithm used is not of concern, provided the end results are equivalent. Our teachings are limited only by the appended claims.

We claim as our invention:

1. A method for extending the lateral subsurface coverage of a VSP survey, comprising the steps of:

lowering a seismic sensor, having three orthogonal axes of sensitivity, to a plurality of successive depth stations in a borehole;

occupying a plurality of seismic source points distributed along at least one line of progressively different horizontal offsets from said borehole;

causing seismic wavefields to emanate from the respective seismic source points;

for each seismic source point and sensor depth station combination, separately recording, along each said axis of sensitivity, the plurality of wavefields sensed by said sensor, the wavefields having propagated along direct, primary and multiply-reflected travel paths from the respective seismic source points;

resolving the angular arrival directions of the respective ones of the plurality of separately-recorded wavefields from their corresponding amplitude vector envelopes;

identifying once-reflected upwardly-propagating wavefields on the basis of their resolved angular arrival directions;

transforming the identified upwardly-propagating wavefields from the VSP domain to the CDP domain to image a primaries-only model of the subsurface;

estimating an initial lateral extension of said primaries-only model;

identifying a first preselected downwardly-propagating multiply-reflected wavefield on the basis of its resolved angular arrival direction;

transforming said first preselected downwardly-propagating wavefield from the VSP domain to the CDP domain;

iteratively ray-tracing the bounce points of said first preselected multiply-reflected downwardly-propagating wavefield with respect to said initial lateral extension of said primaries-only model;

smoothly merging the ray-traced multiply-reflected bounce points with said initial lateral extension; and repeating the steps of identifying, transforming, ray-tracing and merging with respect to second and later preselected downwardly-propagating multiple-reflected wavefields.

2. The method as defined by claim 1, further comprising:

storing the bounce points and travel times of the multiply-reflected wavefields as a function of seismic-source point and sensor depth station;

establishing a time window having a width equal to the time interval occupied by the envelope of wavelets representative of the main lobes of the wavefields;

block-shifting said wavelets to the calculated bounce points;

binning said wavelets in vertical strips; and summing said binned wavelets.

* * * * *